F. O. MATTHIESSEN
VACUUM PAN FOR BOILING SUGAR AND OTHER SUBSTANCES.
No. 66,370.  Patented July 2, 1867.
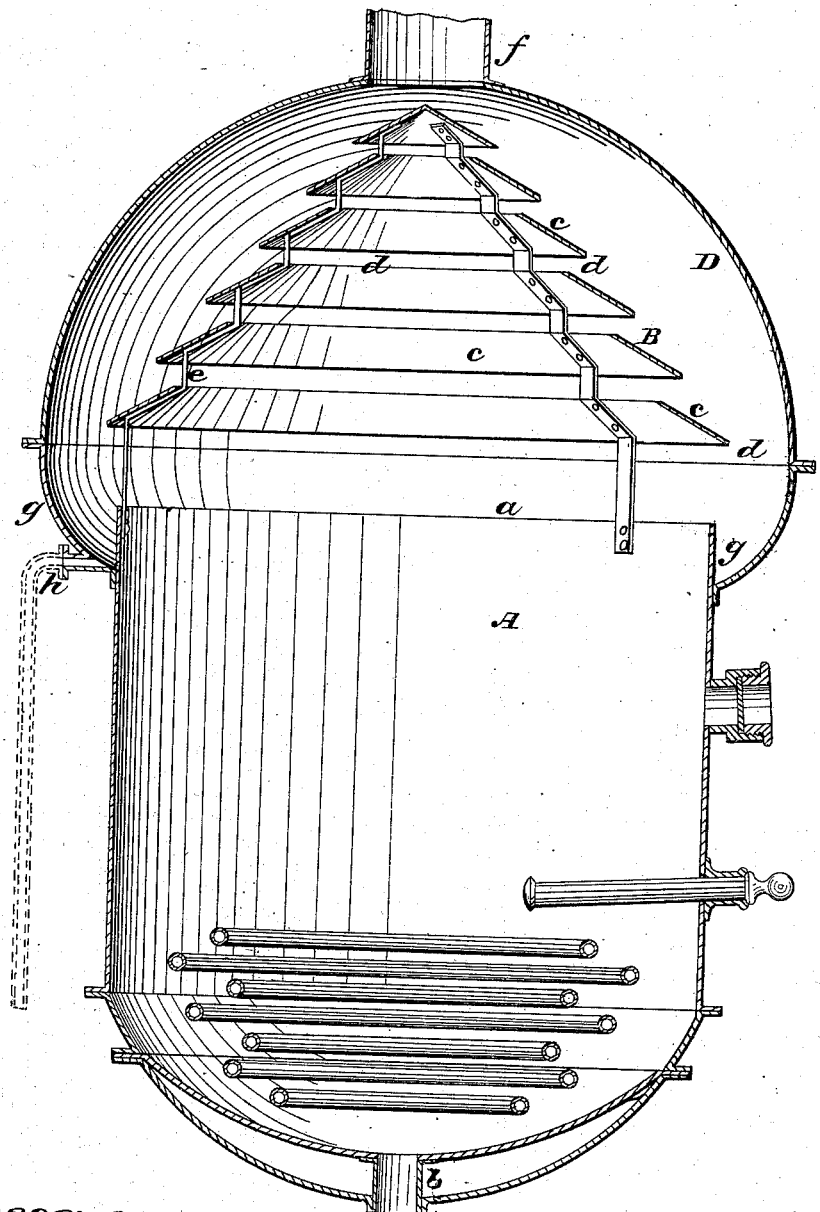

United States Patent Office.

FRANZ O. MATTHIESSEN, OF JERSEY CITY, NEW JERSEY.

Letters Patent No. 66,370, dated July 2, 1867.

---

IMPROVEMENT IN VACUUM-PANS FOR BOILING SUGAR AND OTHER SUBSTANCES.

---

The Schedule referred to in these Letters Patent and making part of the same.

---

TO ALL WHOM IT MAY CONCERN:

Be it known that I, FRANZ O. MATTHIESSEN, of Jersey City, in the county of Hudson, and State of New Jersey, have invented a new and useful Improvement in Vacuum-Pans for Boiling Sugar and other Substances, of which the following is a full, clear, and exact description, reference being had to the accompanying drawing, forming part of this specification, and which represents a vertical section of a vacuum-pan constructed according to my improvement.

The principle of action being the same, whatever the substance to be boiled, it will suffice here to explain the same in connection with vacuum-pans of sugar apparatus.

While this my invention is not exclusively applicable to any one particular form of vacuum-pans, which are usually made either of ball or egg-shape, the form represented in the accompanying drawing is well adapted to illustrate my invention and to effectually or practically carry out the principle thereof. The vacuum-pan, it is well known, forms one of the most important devices in sugar refineries. As heretofore constructed, or by boiling in vacuum, a large quantity of the vapor emitted from the mass, instead of at once passing off or away, is condensed by its contact with the upper rounding or portion of the pan, and falls back into the mass to be evaporated over again at the cost of fuel, and causing delay in effecting the necessary evaporation as well as at the expense of sugar, which is easily transformed into caramel by heat. The object of my invention is to remedy this defect, and the nature of it consists in a free and open construction at its top of the vessel or chamber in which the sugar is boiled with bonnet or cap, or, as I term it, umbrella, of open-work construction, arranged within the dome to the boiling-vessel, said umbrella and dome being so constructed as to catch and convey from falling back into the mass the condensed vapor, as well as to some extent retard or prevent condensation of the vapor till free of its connection with the vessel in which the sugar is boiled.

Referring to the accompanying drawing, A is the vessel in which the sugar is boiled, and here shown of cylindrical form, open at its top, $a$, and of egg-shape at its bottom, which may be provided with the usual lower chamber and worm for effecting evaporation by the admission or circulation of steam; said vessel also being fitted with the usual appliances, such as a peep-opening, tester, and sugar-discharge pipe or aperture, $b$. Over this open-topped vessel A is arranged what I denominate an umbrella, B, of pyramidal form in its general contour, and of an open work character, being preferably made up of oblique or inclined circular slats or annular conical rings $c$, leaving escape openings $d$ for the vapor below or in between them, and being connected, say, by frame strips $e$. This umbrella or open-work cap or bonnet over the open top or mouth $a$ of the vessel A is situated within the dome D of the pan, that is furnished at its upper end with the usual pipe $f$ to establish connection with the condenser, and should be so constructed or enlarged with reference to the vessel A as to convey any condensed vapor on the inside face of the dome, and that may run down over the outer surfaces of the rings $c$ into a trough or channel, $g$, surrounding the upper portion of the vessel A on its outside, and provided with a water-escape pipe, $h$, of say thirty-three feet depth, to maintain the vacuum established by the pump.

From this description it will be perceived that the umbrella B, being within the dome to a large extent, retards or prevents condensation of the vapor over the boiling mass, while a free escape for it is provided through the openings $d$, and all water formed by condensation within the dome, or outside of said umbrella, prevented from falling back into the vessel A, which, as previously specified, is the object sought to be attained by this my invention.

What I here claim, and desire to secure by Letters Patent, is—

The combination of an umbrella or cap or cover of open work construction, with the dome or cover to a vacuum-pan, constructed to form an escape outside of the boiling-vessel for the condensed vapor, and provided with a Torricellian discharge pipe or tube, said umbrella being arranged within the dome and over the boiling-vessel or chamber, essentially as and for the purpose herein set forth.

F. O. MATTHIESSEN.

Witnesses:
HENRY T. BROWN,
J. W. COOMBS.